(12) United States Patent
Smith (10) Patent No.: US 10,680,897 B2
(45) Date of Patent: Jun. 9, 2020

(54) NETWORK MODIFICATION IMPACT PREDICTION

(71) Applicant: Cisco Technology, Inc., San Jose, CA (US)

(72) Inventor: Rodney Bruce Smith, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 140 days.

(21) Appl. No.: 16/040,348

(22) Filed: Jul. 19, 2018

(65) Prior Publication Data

US 2019/0036782 A1    Jan. 31, 2019

Related U.S. Application Data

(60) Provisional application No. 62/539,451, filed on Jul. 31, 2017.

(51) Int. Cl.
*G06F 15/173* (2006.01)
*H04L 12/24* (2006.01)

(52) U.S. Cl.
CPC ........ *H04L 41/0893* (2013.01); *H04L 41/147* (2013.01); *H04L 41/0856* (2013.01); *H04L 41/0873* (2013.01); *H04L 41/12* (2013.01)

(58) Field of Classification Search
CPC ... H04L 41/12; H04L 41/147; H04L 41/0856; H04L 41/0873; H04L 41/0893

USPC ........................................................ 709/223
See application file for complete search history.

(56) References Cited

U.S. PATENT DOCUMENTS

| 2017/0041333 A1* | 2/2017 | Mahjoub | ............. | H04L 61/1511 |
| 2018/0219895 A1* | 8/2018 | Silver | ....................... | G06N 5/02 |
| 2019/0180612 A1* | 6/2019 | Demiryurek | ........... | G06N 20/00 |

* cited by examiner

*Primary Examiner* — Yves Dalencourt
(74) *Attorney, Agent, or Firm* — Polsinelli PC (57) ABSTRACT

A system may include multiple network devices that communicate within a network domain, and a centralized control device configured to perform operations. The operations may include receive a request to modify one or more policies regarding traffic within the network domain, and in response to receiving the request, capture a snapshot of the network domain before modification of the one or more policies. The operations may also include, in response to receiving the request, generate a prediction of the network domain after modification of the one or more policies, and compare the snapshot of the network domain to the prediction of the network domain. The operations may additionally include, based on the comparison of the snapshot and the prediction, provide a predicted impact on the network domain, and, based on the predicted impact being above a threshold, provide an indication that the predicted impact is above the threshold.

20 Claims, 5 Drawing Sheets

NETWORK MODIFICATION IMPACT PREDICTION

CROSS REFERENCE TO RELATED APPLICATIONS

This application claims priority to U.S. Patent App. No. 62/539,451, filed on Jul. 31, 2017, which is hereby incorporated by reference in its entirety.

FIELD

The embodiments discussed in the present disclosure are related to network modification impact prediction.

BACKGROUND

The use of networks is a useful tool in allowing communication between distinct computing devices. Despite the proliferation of computers and networks over which computers communicate, there still remain various limitations to current network technologies.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a system. The system may include multiple network devices configured to facilitate communication within a network domain, and a centralized control device configured to communicate with the network devices over a control plane, and where the centralized control device may be further configured to perform operations. The operations may include receive a request to modify one or more policies regarding traffic within the network domain, and in response to receiving the request, capture a snapshot of the network domain before modification of the one or more policies. The operations may also include, in response to receiving the request, generate a prediction of the network domain after modification of the one or more policies, and compare the snapshot of the network domain to the prediction of the network domain. The operations may additionally include, based on the comparison of the snapshot and the prediction, provide a predicted impact on the network domain, and, based on the predicted impact being above a threshold, provide an indication that the predicted impact is above the threshold.

One or more embodiments of the present disclosure may include a method that includes receiving at a centralized control device a request to modify one or more policies regarding traffic within a network domain, and, in response to receiving the request, capturing a snapshot of the network domain before modification of the one or more policies. The method may also include, in response to receiving the request, generating a prediction of the network domain after modification of the one or more policies, and comparing the snapshot of the network domain to the prediction of the network domain. The method may additionally include, based on the comparison of the snapshot and the prediction, providing a predicted impact on the network domain, and, based on the predicted impact being above a threshold, providing an indication that the predicted impact is above the threshold.

One or more embodiments of the present disclosure may include a method that includes receiving at a centralized control device a request to modify one or more policies regarding traffic within a network domain from a user, and in response to receiving the request, capturing a first snapshot of the network domain before modification of the one or more policies. The method may also include determining a status of the user, and, based on the status of the user, implementing the modification of the one or more policies in the network domain. The method may additionally include generating a second snapshot of the network domain after implementing the modification of the one or more policies, and comparing the first snapshot to the second snapshot of the network domain, and, based on the comparison of the first snapshot and the second snapshot, providing an impact on the network domain. The method may also include, based on the impact being above a threshold, providing an indication that the impact is above the threshold.

One or more embodiments of the present disclosure may additionally include systems and/or non-transitory computer readable media for facilitating the performance of such methods.

The object and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Embodiments of the present disclosure relate, inter alia, to the prediction and/or detection of the impact of a network modification on the overall network. Network modifications may cause unintended consequences or changes to an overall network. Furthermore, as the size and complexity of the network increases, the risk of unintended consequences and the magnitude of those consequences can change exponentially. For example, a network engineer may modify a policy to allow two network devices to communicate, and that may be the only change expected. However, such a change may have the unintended consequence of making thousands of network nodes accessible from outside of a secure network domain. As another example, a network engineer may modify a policy to prevent two network devices from communicating, and that may be the only change expected. However, such a change may have the unintended consequence of preventing thousands of network nodes from accessing the Internet. Such unintended consequences can be further exasperated because of the practicalities of implementing such network changes. Often, such changes are implemented during off-peak hours (e.g., at 2 AM over a weekend) and after being implemented, the person implementing the change is motivated to be done quickly and so may check one or two verifying aspects of the network and leave the office. If an unintended consequence has occurred, it may not be realized until hours later. Being able to predict or detect such large-scale impacts on a network may be beneficial to prevent such unintended consequences, or to allow a network engineer to make an informed choice that such consequences are worth the intended change.

In one or more embodiments of the present disclosure, when modifying a network, a network engineer may submit the modification to a centralized controller in communication with multiple network devices in a network. The centralized controller may capture a snapshot of the network prior to implementation of the modification. After capturing the snapshot, the centralized controller may generate a prediction of the network after the modification has been implemented. The centralized controller may compare the snapshot of the network with the prediction of the network to determine a magnitude of a predicted impact on the network. If the predicted impact is above a threshold, the centralized controller may present an indication of the predicted impact, e.g., indicating that the requested modification will have a large impact on the network. Additionally or alternatively, the centralized controller may prevent the modification from being implemented in the network.

One or more embodiments of the present disclosure may include solutions to problems associated with implementing network modifications. One such problem is the prevention and/or detection of unintended consequences. For example, a network modification may be requested as being implemented, but the requested modification may cause a large unintended consequence in the network. One or more embodiments of the present disclosure may predict and/or detect a magnitude of a change in the network such that unintended consequences can be avoided, prevented, or mitigated. Such improvements may cause the network to operate more efficiently and more consistently because unintended consequences such as outages, exposure, etc. can be avoided, prevented, or mitigated.

Embodiments of the present disclosure are explained with reference to the accompanying drawings.

Figure 1:
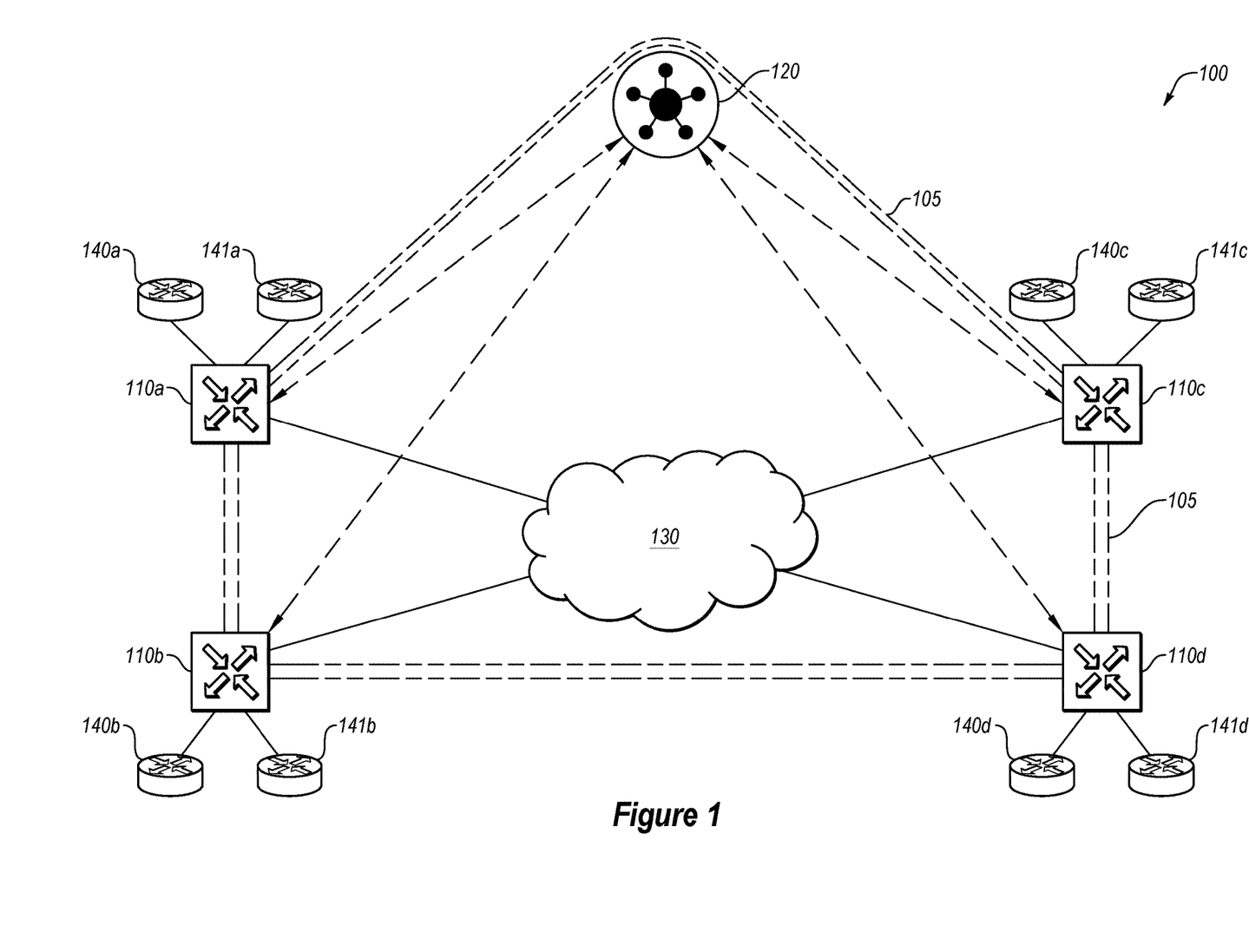
FIG. 1 illustrates an example system of network components implementing a software-defined network.

FIG. 1 illustrates an example system 100 of network components implementing a software-defined network, in accordance with one or more embodiments of the present disclosure. The system 100 may include an internal network domain 105 and one or more external network domains. The system 100 may include one or more edge network devices 110 (such as the edge network devices 110a-110d), a control device 120, a communication network 130, and external network devices 140 and 141 (such as the external network devices 140a-140d and 141a-141d). The system 100 may predict and/or monitor for unexpected consequences in the internal network domain 105 for requested modifications in the internal network domain 105.

The system 100 may implement a software-defined network. A software-defined network may include a network that is managed by software rather than controlled by hardware. As such, a software-defined network may support multiple types of connections, such as the Internet, Multi-Protocol Label Switching (MPLS) connections, and/or cellular connections (such as Long Term Evolution (LTE), LTE Advanced, 4G, Worldwide Interoperability for Microwave Access (WiMAX), and/or others). Additionally, a software-defined network may support load balancing or load sharing between the various connections. Further, because of the distributed nature of a network, a software defined network may support virtual private networks (VPNs), firewalls, and other security services. In a software-defined network, for example, a control plane may be functionally separated from the physical topology. In some embodiments, a software-defined network may separate the control plane of the network (to be managed via software) from a data plane of the network (operating on the hardware of the network). As used herein, the term control plane may refer to communications and connections used in the control and administration of a network itself, rather than the transmission of data through the network, which may occur at the data plane. As used herein, the term data plane may refer to communications and connections used in the transmission and reception of data through the network. For example, the control plane may include administrative traffic directed to a network device within a network, while the data plane may include traffic that passes through network devices within the network.

In some embodiments, a software-defined network may be implemented as a software-defined wide area network (SD-WAN), local area network (LAN), metropolitan area network (MAN), among others. While one or more embodiments of the present disclosure may be described in the context of an SD-WAN, such embodiments may also be implemented in any software-defined network. Furthermore, while embodiments may be described in terms of software-defined networks, the present disclosure is also applicable to other networks.

In some embodiments, the control device 120 may be configured to manage the control plane of an internal network domain 105 by directing one or more aspects of the operation of the edge network devices 110. For example, the control device 120 may generate and/or distribute policies to one or more of the edge network devices 110. A policy may include a rule or set of rules bearing on the handling of network traffic, such as routing, priority, media, etc. The internal network domain 105 may operate as a secured and controlled domain with specific functionality and/or protocols. In some embodiments, the edge network devices 110 may operate based on one or more policies created and/or propagated by the control device 120. In these and other embodiments, the edge network devices 110 may route data traffic within the internal network domain 105 based on the policies created and/or propagated by the control device 120.

In some embodiments, the control device 120 may include an interface by which a user such as a network engineer may submit a request to modify to one or more network policies. For example, the user may submit a modification to the control device 120 of one of the policies of the internal network domain 105. The control device 120 may store the modification before automatically entering the modification. By storing the modification, the control device 120 may analyze the modification and/or the user requesting the modification before implementing the modification.

In some embodiments, after receiving a requested modification, the control device 120 may capture a snapshot of the internal network domain 105. The snapshot may include readings or statuses of one or more variables related to the internal network domain 105. The variables may include a number of nodes in the internal network domain 105; a number of reachable destinations within the internal network domain 105; a number of routes in the internal network domain 105; a number of port ranges used by one or more of the edge network devices 110; a number of links of the edge network devices 110; a number of tunnels through the internal network domain 105; a structure of the routes through the internal network domain 105 (e.g., a hub-and-spoke structure, a full mesh structure, a partial mesh structure, etc.); a status, profile, or configuration of one or more of the edge network devices 110; a number of applications accessible via the internal network domain 105; a number of applications whose traffic is allowed to traverse the internal network domain 105; a number of WAN interfaces for each of the edge network devices 110; a number of LAN interfaces for each of the edge network devices 110; a number of network services inserted in the internal network domain 105; what network services are inserted in the internal network domain 105; a number of the edge network devices 110 reachable from outside of the internal network domain 105; bandwidth at one or more various places, routes, links, etc. of the internal network domain 105; a number of autonomous systems (e.g., a large group of network/Internet resources under common control such as by an Internet Service Provider (ISP) like Verizon, AT&T, etc.) usable by the internal network domain 105; and/or others. The snapshot may be stored by the control device 120.

In some embodiments, the control device 120 may generate a prediction of the internal network domain 105 after implementing the requested modification. For example, the control device 120 may simulate the internal network domain 105 and may simulate implementing the modification in the simulated internal network domain 105. As another example, the control device 120 may implement the modification in a sandbox environment. For example, a network device that is not part of the internal network domain 105 but is part of a test network environment may implement the modification such that the control device 120 may observe modifications in the sandbox environment after implementing the modification.

After obtaining the snapshot of the internal network domain 105 and the prediction of a state of the internal network domain 105 after the modification, the control device 120 may compare the internal network domain 105 before the modification to the internal network domain 105 after the modification by comparing the snapshot with the prediction. In some embodiments, the comparison includes a comparison of one or more of the variables from the snapshot and the prediction. For example, a number of routes in the internal network domain 105 may be a variable of the snapshot compared to the same variable in the prediction. In these and other embodiments, an absolute value of the difference may be used in determining an impact on the internal network domain 105. For example, whether adding five hundred new routes or removing five hundred routes, the total change may be represented by a numerical value of five hundred. In these and other embodiments, any number of variables may be included in determining a predicted impact on the internal network domain 105. Additionally or alternatively, weighting factors may be used with one or more of the various variables. Weighting factors may also be used for various routes, links, edge network devices 110, etc. such that more important routes or network locations may indicate a larger impact if a change is made at such a location or to such a route.

In some embodiments, the predicted impact may be represented by a numerical value represented by an absolute value change in the variable from the snapshot to the prediction, with a weighting factor for each of the variables. In some embodiments, an indicator may be presented to the user regarding the predicted impact on the internal network domain 105. For example, the numerical value, an icon indicative of the numerical value, or a color indicator of the numerical value may be presented. In some cases, the predicted impact may be compared against one or more thresholds to determine a magnitude of the predicted impact on the internal network domain 105.

In some embodiments, if the control device 120 determines that the predicted impact for a requested modification is below a threshold, the control device 120 may implement the requested modification without further review. In these and other embodiments, if the control device 120 determines that the predicted impact for the requested modification is above the threshold, the control device 120 may provide an indication that the predicted impact is above the threshold. Additionally or alternatively, the control device 120 may transmit the requested modification to another user(s) (e.g., a senior network engineer or committee of network engineers) to review the modification before implementation. In these and other embodiments, the requested modification may be prevented from being implemented until some other action is taken by another user than the user who submitted the requested modification.

In some embodiments, the threshold may be based on a status of the user submitting the requested modification. For example, if the user submitting the requested modification has worked for a company for twenty years, she may have a higher threshold of impactful modification as compared to a user who has worked for the company for six months. As another example, a title of the user may impact the threshold. For example, a senior vice-president of engineering may have a higher threshold than a part-time network assistant. As another example, a certification, degree, area of specialty, trainings attended/completed, etc. may be included in the status of the user. In some embodiments, the status of the user may be related to the requested modification. For example, if the user submitting the requested modification has an area of specialty in network cryptography and the requested modification adjusted one or more of the encryption mechanisms used in the network, the threshold may be higher than if the user were requesting modification of priorities of communication modalities. In some embodiments, the status of the user may be based on the time zone in which the user is located. For example, the time zone may be compared with the time the modification is requested (e.g., a request at 11 PM Pacific Time would be 2 AM Eastern Time) as a user may be more cognizant at different times. For example, a user in the Pacific Time Zone may have a higher threshold at 11 PM compared to a user in the Eastern Time Zone at 2 AM.

In some embodiments, the control device 120 may form a control plane connection with each of the edge network devices 110. The control plane connection may facilitate the exchange of management data between the edge network devices 110 and the control device 120 for management and control of the internal network domain 105. The control plane connection may operate as a tunnel through the communication network 130, such as a Datagram Transport Layer Security (DTLS) tunnel. In some embodiments, data transmitted over the control plane connection may facilitate the control device 120 determining topology of the communication network 130. For example, the control device 120 may communicate with the edge network devices 110 to determine what physical connections exist between and among the edge network devices 110 in the communication network 130. Additionally or alternatively, data transmitted over the control plane connection may facilitate the control device 120 determining optimal or desired paths across the communication network 130 between and among the edge network devices 110. Additionally or alternatively, the control device 120 may communicate route information to the edge network devices 110 over the control plane connection. In these and other embodiments, the control plane connection may include a permanent connection between the control device 120 and the edge network devices 110 such that if the connection between the control device 120 and a given edge network device 110 is broken, the edge network device 110 may be unable or otherwise disallowed from communicating over the internal network domain 105.

In some embodiments, the control device 120 may maintain a central route table that stores route information within the internal network domain 105. For example, the control device 120 may communicate with various edge network devices 110 to determine the physical connections available to the edge network devices 110 through the communication network 130. In some embodiments, the edge network devices 110 may include one or more physical connections to each other. In these and other embodiments, the control device 120 may generate and/or update one or more policies in conjunction with the central route table to determine data traffic routes through the internal network domain 105, and may communicate those data traffic routes to the edge network devices 110. In at least one embodiment, the control device 120 may provide policies and other categorical rules related to traffic flows to the edge network devices 110 rather than being involved with every individual flow through the internal network domain 105. In some embodiments, the control device 120 may utilize the central route table to capture the snapshot of the internal network domain 105.

In these and other embodiments, the edge network devices 110 may not have stored the topology and/or route paths of the entire system 100. Each of the edge network devices 110 may not need to query each other individually to determine reachability. Instead, the control device 120 may provide such information to the edge network devices 110. Additionally or alternatively, a subset of the reachability and/or infrastructure information may be provided to the edge network devices 110, for example, based on one or more policies of the control device 120. In these and other embodiments, the control device 120 may route traffic through a most direct route, or through some other route based on one or more other policies of the control device 120.

In some embodiments, the one or more policies may include guidance regarding determining next-hop instructions. For example, a particular policy may instruct a particular edge network device 110 where to route the traffic next for a particular category, class, or group of traffic flows, rather than providing a complete end-to-end route for the traffic. For example, the edge network device 110*a* may receive data from an external network device 140*a* directed to an address of the external network device 141*c*. The edge network device 110*a* may have stored a first policy that includes a first traffic data route from the control device 120 indicating that a "next-hop" for network traffic destined for the address of the external network device 141*c* is to be routed to the edge network device 110*d*. The first traffic data route may indicate what connection or connections the edge network device 110*a* may use to route the traffic to the edge network device 110*d*. The edge network device 110*d* may have stored a second policy that includes a second traffic data route from the control device 120 indicating that a "next-hop" for network traffic destined for the address of the external network device 141*c* may be routed to the edge network device 110*c*. The second traffic data route may indicate what connection or connections the edge network device 110*d* may use to route the traffic to the edge network device 110*c*. The edge network device 110*c* may receive the data and may route the data to the external network device 141*c* with or without using a policy to arrive at this routing decision.

In addition to generating policies to guide the edge network devices 110 in making routing decisions, the control device 120 may generate policies that are to be followed by the edge network devices 110. In some embodiments, the control device 120 may generate policies to cause certain network traffic flows within the internal network domain 105 to be routed over certain types of connections (e.g., LTE, MPLS) and/or through certain edge network devices 110. For example, the control device 120 may check the central route table and determine that a direct connection exists between the edge network device 110*a* and the edge network device 110*c*. Rather than allowing data to be routed directly between the edge network device 110*a* and the edge network device 110*c*, the control device 120 may generate a policy to instead cause the data to be routed through the edge network device 110*d*. For example, the data may be routed through the edge network device 110*d* for various reasons, such as because the edge network device 110*d* may include a firewall, data filter, security feature, data loss prevention (DLP) feature, export control, or government compliance feature, among others. As another example, the control device 120 may generate a policy to cause one or more of the edge network devices 110 to route traffic through an edge network device 110 associated with a data center, for example, because the data center includes a firewall, data filter, etc. Using such an approach, the flow of traffic within the internal network domain 105 may be readily controlled and guided based on policies and traffic routes propagated by the control device 120 to the edge network devices 110. In these and other embodiments, the submission of a new policy or the modification of an existing policy may qualify as a modification that may be analyzed to determine its predicted impact on the internal network domain 105.

In some embodiments, the control device 120 may store authentication information for one or more (or all) of the edge network devices 110 within the internal network domain 105. In these and other embodiments, a device may be prevented from communicating within the internal network domain 105 unless the device has authentication information that matches or otherwise corresponds to the stored authentication information of the control device 120. In some embodiments, the authentication information may be used when the edge network devices 110 first come on line to establish the control plane connection, and any device without a control plane connection with the control device 120 may be prevented from communicating within the internal network domain 105.

The edge network devices 110 may operate at a boundary of the internal network domain 105. The edge network devices 110 may include one or more physical and/or logical connections that may operate within the internal network domain 105. Such connections may be illustrated as part of the communication network 130. Additionally or alternatively, the edge network devices 110 may include one or more physical and/or logical connections operating outside of the internal network domain 105. For example, the edge network devices 110 may be connected to the external network device(s) 140 and/or 141. The number of physical and/or logical connections may be included as a variable in the snapshot and/or prediction of the internal network domain 105.

In some embodiments, the edge network devices 110 may operate to route traffic from associated external network devices 140 and 141 into the internal network domain 105. Additionally or alternatively, the edge network devices 110 may operate to route traffic from the internal network domain 105 to the associated external network devices 140 and 141. In some embodiments, the edge network devices 110 may communicate with associated external network devices 140 and 141 using typical communication protocols, such as Open Shortest Path First (OSPF), Border Gateway Protocol (BGP), Virtual Router Redundancy Protocol (VRRP), and Bi-directional Forwarding Detection (BFD), among others. Additionally or alternatively, the edge network devices 110 may support other network functionalities such as Virtual Local Area Network (VLAN) tagging, Quality of Service (QoS) monitoring, Service Level Agreements (SLA), Internet Protocol (IP) forwarding, Internet Protocol Security (IPsec), Access Control Lists (ACL), among others.

In some embodiments, the edge network devices 110 may locally maintain one or more local route tables. In some embodiments, the edge network devices 110 may adjust or modify the local route tables based on one or more policies sent from the control device 120. For example, one or more entries may be removed, discarded, or otherwise not added to the local route tables by the edge network devices 110 based on the one or more policies. In some embodiments, the edge network devices 110 may include logic to update, modify, and/or generate the local route tables based on traffic handled by the edge network devices 110. The one or more local route tables may be automatically populated by the edge network devices 110 based on direct interface routes, static routes, and/or dynamic routes learned using one or more network protocols such as BGP and/or OSPF. In some embodiments, routing decisions for data outside of the internal network domain 105 may be performed by a particular edge network device 110 without specific direction, input, or control from the control device 120. For example, the particular edge network device 110 may compute a routing decision based on the one or more policies that the particular edge network device 110 has received from the control device 120 and/or with reference to the local route table of the particular edge network device 110.

In some embodiments, one or more of the edge network devices 110 and/or the control device 120 may be implemented as one or more virtual machines operating on one or more physical computing devices. Additionally or alternatively, the edge network devices 110 and/or the control device 120 may each include an individual stand-alone computing device.

Modifications, additions, or omissions may be made to FIG. 1 without departing from the scope of the present disclosure. For example, while illustrated as including four edge network devices 110 and one control device 120, the system 100 may include any number of edge network devices 110 and control devices 120, such as thousands or tens of thousands of edge network devices 110 and more than five control devices 120. As another example, as illustrated as a single communication network 130, the communication network 130 may include multiple types of communication connections.

Figure 2:
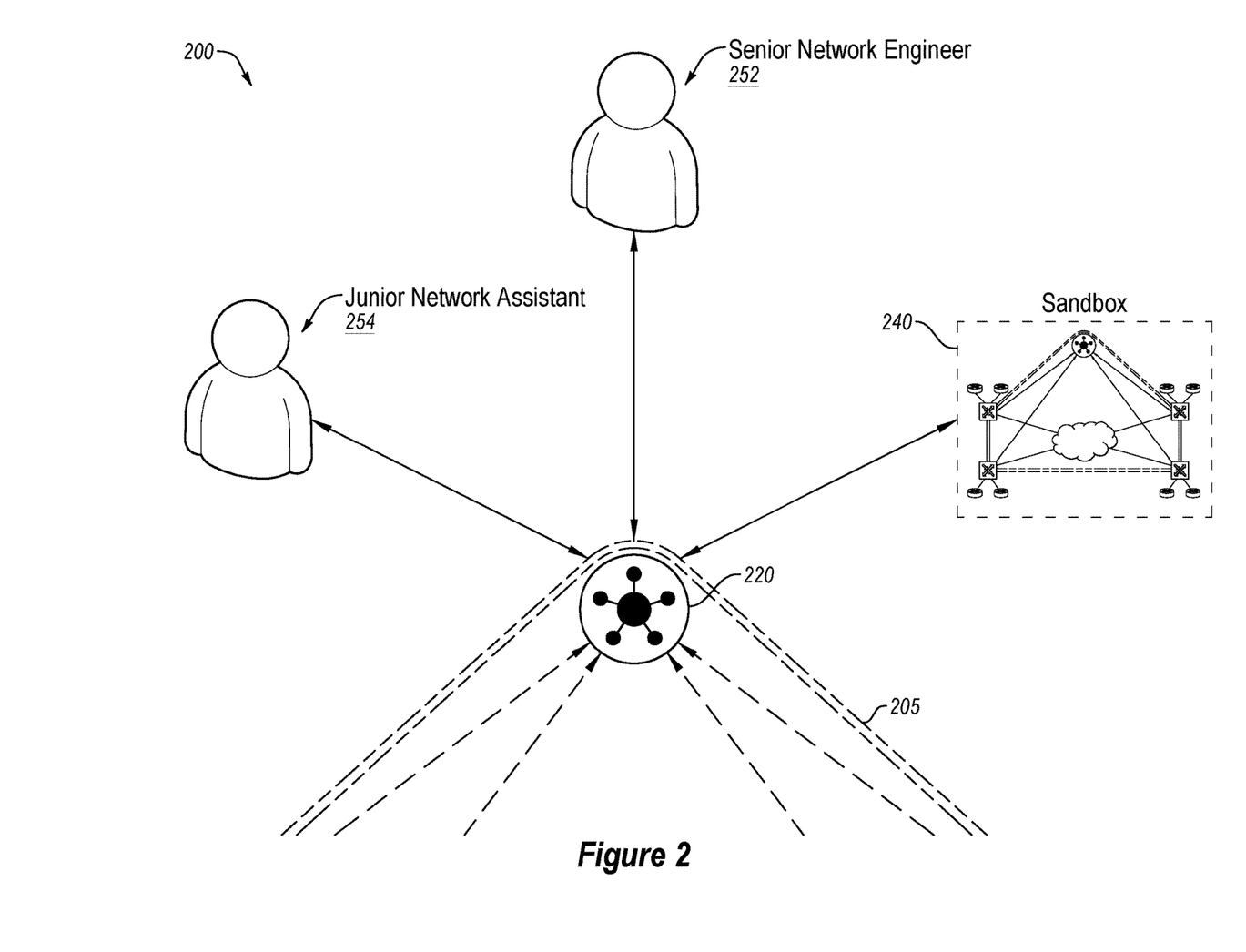
FIG. 2 illustrates an example system for predicting network modification impact.

FIG. 2 illustrates an example system 200 for predicting network modification impact, in accordance with one or more embodiments of the present disclosure. The system 200 may be similar or comparable or similar to the system 100 of FIG. 1. For example, the system 200 may include an internal network domain 205 that may be similar or comparable to the internal network domain 105 of FIG. 1. The internal network domain 205 may include any number of edge network devices (not illustrated). For example, the internal network domain 205 may span hundreds of locations, each with thousands of edge network devices. Any size of internal network domain is within the scope of the present disclosure. However, as the internal network domain 205 becomes larger, the potential impact of unintended consequences can become much larger and are harder to predict or expect. The internal network domain 205 may include a control device 220 that may be similar or comparable to the control device 120 of FIG. 1. For example, the control device 220 may facilitate predicting the impact of a requested modification on the internal network domain 205.

In some embodiments, a junior network assistant 254 may submit a requested modification to a policy in the internal network domain 205. The control device 220 may receive the requested modification from the junior network assistant 254. The control device 220 may store the requested modification and capture a snapshot of the internal network domain 205.

In some embodiments, the control device 220 may implement the modification in a sandbox 240. For example, the sandbox 240 may include a network and/or network devices that are outside of the internal network domain 205. Using the sandbox 240, the control device 220 may observe operation of implementation of the modification in order to determine a predicted impact in the internal network domain 205 without actually implementing the modification in the internal network domain 205. In some embodiments, the sandbox 240 may include a physical network device. Additionally or alternatively, the sandbox 240 may include a virtual representation of at least a portion of the internal network domain 205. In some embodiments, the sandbox 240 may include a simulation of the entire internal network domain 205.

After implementing the modification in the sandbox 240, the control device 220 may obtain a snapshot of the sandbox 240 as a prediction of the internal network domain 205 after implementing the requested modification. The control device 220 may compare the snapshot of the internal network domain 205 with the prediction of the internal network domain 205. In these and other embodiments, the comparison may yield a prediction of the impact of the modification on the internal network domain 205 as explained with reference to FIG. 1.

In some embodiments, if the control device 220 determines that the predicted impact of the modification is above a threshold, the control device 220 may prevent immediate implementation of the modification. Additionally or alternatively, the control device 220 may send the requested modification to a senior network engineer 252 to review the requested modification submitted by the junior network assistant 254. If the senior network engineer 252 approves the modification, the modification may be implemented in the internal network domain 205.

In some embodiments, rather than predicting potential impact on a network before implementation, the control device 220 may monitor the impact of a modification after the modification has been implemented. For example, if the senior network engineer 252 submits a requested modification to the control device 220, the control device 220 may capture a snapshot of the internal network domain 205. After capturing the snapshot, the control device 220 may implement the modification. The control device 220 may generate a snapshot after implementing the modification to determine an impact of the modification on the internal network domain 205. The two snapshots may be compared in a similar manner as the comparison of the snapshot and the prediction of the internal network domain 205. For example, one or more variables of the snapshot before implementing the modification may be compared with those of the snapshot after implementing the modification.

In some embodiments, the control device 220 may periodically generate snapshots at various points in time after implementing a modification to one or more policies of the internal network domain 205. In these and other embodiments, each successive snapshot may be compared to the initial snapshot before implementing the modification and/or may be compared to the preceding snapshot.

In some embodiments, the control device 220 may implement a requested modification before predicting the impact based on whether the requested modification is submitted by the junior network assistant 254 or whether submitted by the senior network engineer 252. For example, a modification submitted by the senior network engineer 252 may be implemented without verifying the predicted impact.

Modifications, additions, and omissions may be made to FIG. 2 without departing from the scope of the present disclosure. For example, the internal network domain 205 may include any number of network devices and may take any topology or structure. As another example, the internal network domain 205 may include more than one control device 220. In these and other embodiments, a central device may coordinate between the control devices. As an additional example, any number of users with any number of titles submitting requests are within the scope of the present disclosure.

Figure 3:
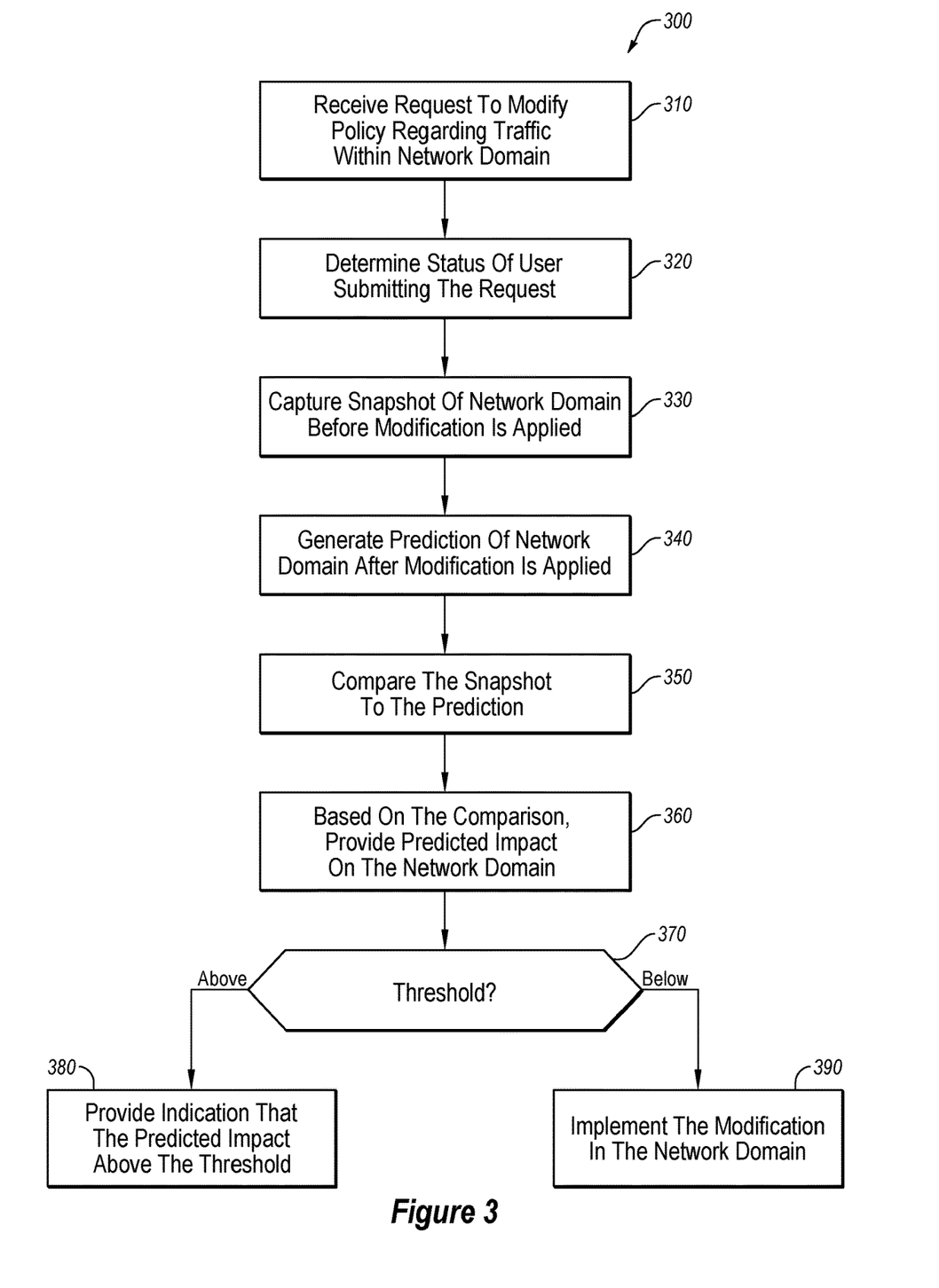
FIG. 3 illustrates a flowchart of an example method of predicting an impact of a network modification.

FIG. 3 illustrates a flowchart of an example method 300 of predicting an impact of a network modification, in accordance with one or more embodiments of the present disclosure. Although illustrated as discrete blocks, various blocks may be divided into additional blocks, combined into fewer blocks, or eliminated, depending on the particular implementation.

At block 310, a request may be received to modify a policy regarding traffic within a network domain. For example, a control device (such as the control device 120 of FIG. 1 or 220 of FIG. 2) may receive a request to modify a policy that impacts traffic between one or more network devices (e.g., the edge network devices 110 of FIG. 1) within an internal network domain (e.g., the internal network domain 105 of FIG. 1 or 205 of FIG. 2).

At block 320, the control device may determine a status of the user submitting the request. For example, the control device may determine a title of the user submitting the request. As another example, the control device may determine a duration of time that the user has worked for the organization that maintains the network domain. In some embodiments, the control domain may obtain a user profile of the user submitting the request and may check one or more elements of the user profile.

At block 330, the control device may capture a snapshot of the network domain before applying the modification. For example, the control device may gather the latest statistics or information as stored at the control device with respect to the network domain. As another example, the control device may query one or more network devices to obtain updated information regarding one or more of the network devices. The snapshot may include one or more variables representative of an aspect of the network domain.

At block 340, the control device may generate a prediction of the network domain after the modification is applied. For example, the control device may implement the modification in a sandbox environment. As another example, the control device may simulate the network domain or a portion thereof and may implement the modification in the simulation. In some embodiments, the control device may obtain the equivalent of a snapshot of the simulation or sandbox environment.

At block 350, the control device may compare the snapshot and the prediction of the network domain. For example, the control device may compare one or more of the variables from the snapshot with the corresponding variable of the network domain. The comparison of the variables may be performed as an absolute value such that increases or decreases may affect the comparison equally. In some embodiments, the comparison may include a weighting factor for one or more of the variables. Additionally or alternatively, a weighting factor may be used for one or more of the network devices, routes, links, modalities of communication, etc. within the network domain. In some embodiments, the results of the comparison may be a numerical value representative of the impact on the network domain.

At block 360, based on the comparison, the control device may provide a predicted impact on the network domain. For example, the control device may provide the numerical value of the output of block 350.

At block 370, a determination may be made as to whether the predicted impact is above a threshold. In some embodiments, the threshold may be based on the user submitting the request. If the predicted impact is above the threshold, the method 300 may proceed to the block 380. If the predicted impact is below the threshold, the method 300 may proceed to the block 390.

At block 380, an indication may be provided that the predicted impact is above the threshold. For example, the requesting user may be informed that the modification will not be implemented immediately. As another example, the requested modification may be provided to another user or users to review the requested modification before it is implemented. In some embodiments, for example, if submitted by a senior network engineer, after providing the indication, the control device may query the requesting user to approve the modification. Additionally or alternatively, the control device may provide the indication and may additionally implement the requested modification.

At block 390, based on the predicted impact being below the threshold, the modification may be implemented in the network domain.

One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 4:
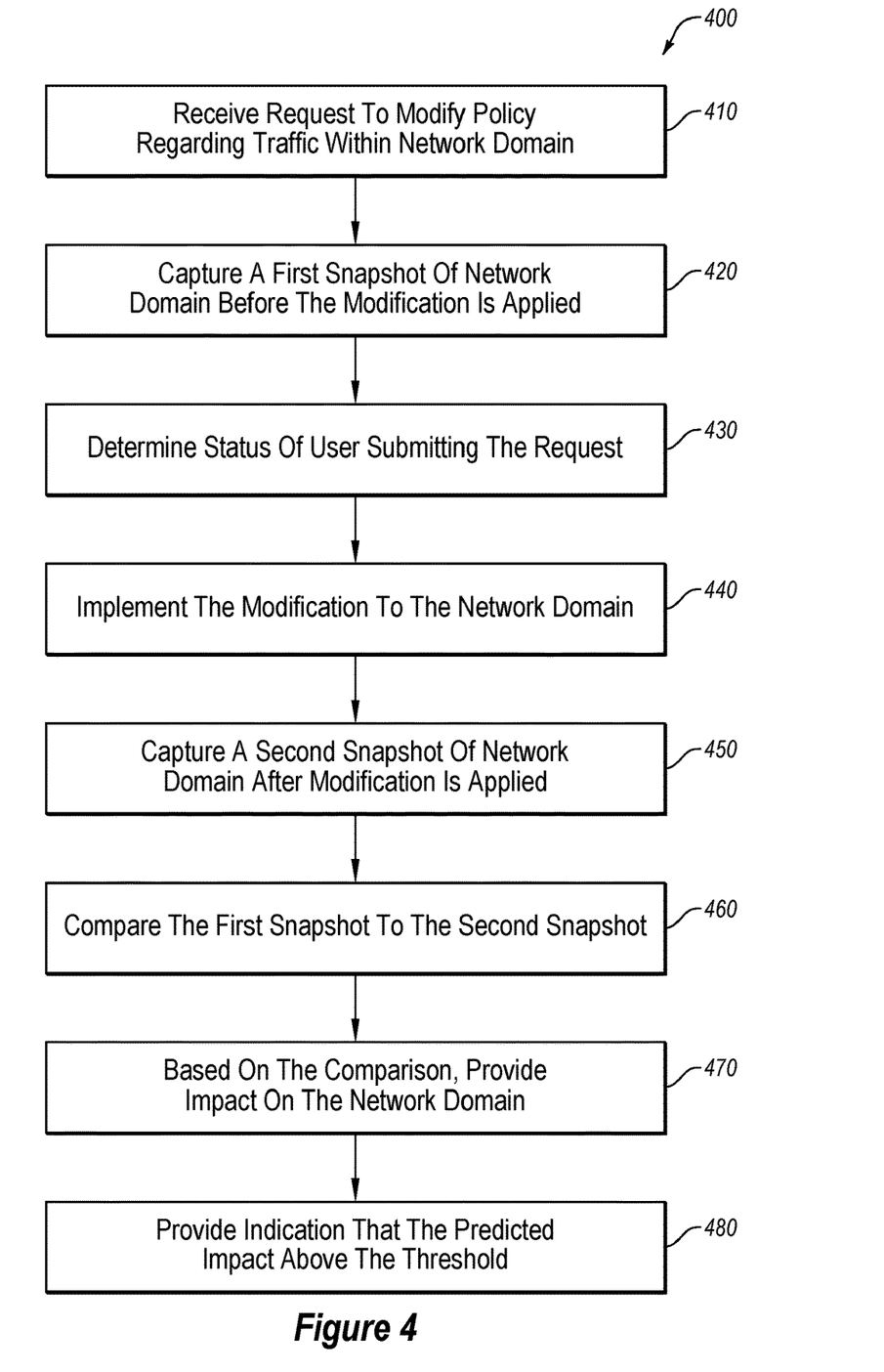
FIG. 4 illustrates a flowchart of an example method of determining an impact of a network modification.

FIG. 4 illustrates a flowchart of an example method 400 of determining an impact of a network modification, in accordance with one or more embodiments of the present disclosure. Although illustrated as discrete blocks, various blocks may be divided into additional blocks, combined into fewer blocks, or eliminated, depending on the particular implementation.

At block 410, a request may be received to modify a policy regarding traffic within a network domain. The block 410 may be similar or comparable to the block 310 of FIG. 3.

At block 420, a first snapshot may be captured of the network domain before the modification is applied. The block 420 may be similar or comparable to the block 330 of FIG. 3.

At block 430, a status of the user submitting the request may be determined. The block 430 may be similar or comparable to the block 320 of FIG. 3.

At block 440, the modification may be implemented in the network domain. For example, based on the status of the user, the control device may implement the requested modification. The status of the user may include the duration of time the user has been employed by the organization that maintains the network domain, a title of the user, and or another property of a user profile of the user.

At block 450, a second snapshot of the network domain may be captured after the modification has been applied. For example, at periodic intervals or at a set time after the modification has been implemented, the control device may capture a snapshot of the network domain.

At block 460, the first snapshot may be compared to the second snapshot. The block 460 may be similar or comparable to the block 350 of FIG. 3, although comparing two snapshots rather than comparing a snapshot and a prediction of the network domain. The comparison of the block 460 may yield an impact of the modification on the network domain.

At block 470, based on the comparison, the impact of the modification may be provided. For example, a user who requested the modification or another user (e.g., a system administrator) may be presented with the impact of the modification. In some embodiments, the impact may be compared to a threshold and an indication of exceeding the threshold may be provided in addition to the impact. In these and other embodiments, an option to reverse or roll-back the modification may be presented to the user.

One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 5:
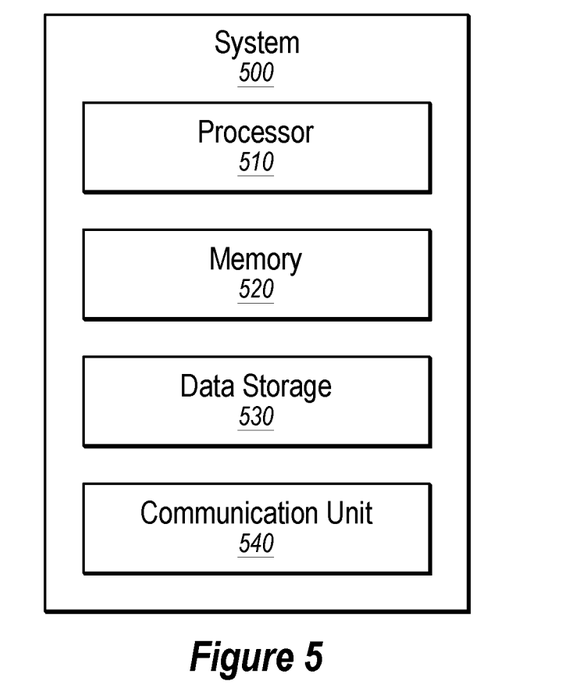
FIG. 5 illustrates an example computing system.

FIG. 5 illustrates an example computing system 500, according to at least one embodiment described in the present disclosure. The system 500 may include any suitable system, apparatus, or device configured to predict or detect the impact of a network modification. The computing system 500 may include a processor 510, a memory 520, a data storage 530, and a communication unit 540, which all may be communicatively coupled. In some embodiments, any of the network devices (e.g., the edge network devices 110 of FIG. 1), control devices (e.g., the control devices 120, or 220 of FIGS. 1 and 2), or other computing devices of the present disclosure may be implemented as the computing system 500. Additionally or alternatively, one or more of the network devices, control devices, or other computing devices may be implemented as virtualized machines operating on a physical computing system such as the computing system 500.

Generally, the processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 5, it is understood that the processor 510 may include any number of processors distributed across any number of network or physical locations that are configured to perform individually or collectively any number of operations described in the present disclosure. In some embodiments, the processor 510 may interpret and/or execute program instructions and/or process data stored in the memory 520, the data storage 530, or the memory 520 and the data storage 530. In some embodiments, the processor 510 may fetch program instructions from the data storage 530 and load the program instructions into the memory 520.

After the program instructions are loaded into the memory 520, the processor 510 may execute the program instructions, such as instructions to perform the methods 300 or 400 of FIGS. 3 and 4, respectively. For example, the processor 510 may determine that a given network modification has a predicted impact beyond a threshold and may prevent implementation of the modification until the modification can be reviewed by another network engineer.

The memory 520 and the data storage 530 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 510. In some embodiments, the computing system 500 may or may not include either of the memory 520 and the data storage 530.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 510 to perform a certain operation or group of operations.

The communication unit 540 may include any component, device, system, or combination thereof that is configured to transmit or receive information over a network, such as an MPLS connection, the Internet, a cellular network (e.g., an LTE network), etc. In some embodiments, the communication unit 540 may communicate with other devices at other locations, the same location, or even other components within the same system. For example, the communication unit 540 may include a modem, a network card (wireless or wired), an optical communication device, an infrared communication device, a wireless communication device (such as an antenna), a chipset (such as a Bluetooth device, an 802.6 device (e.g., Metropolitan Area Network (MAN)), a WiFi device, a WiMax device, cellular communication facilities, or others), and/or the like, or any combinations thereof. The communication unit 540 may permit data to be exchanged with a network and/or any other devices or systems described in the present disclosure. For example, the communication unit 540 may allow the system 500 to communicate with other systems, such as network devices, control devices, and/or other networks.

Modifications, additions, or omissions may be made to the system 500 without departing from the scope of the present disclosure. For example, the data storage 530 may be multiple different storage mediums located in multiple locations and accessed by the processor 510 through a network.

As indicated above, the embodiments described in the present disclosure may include the use of a special purpose or general purpose computer (e.g., the processor 510 of FIG. 5) including various computer hardware or software modules, as discussed in greater detail below. Further, as indicated above, embodiments described in the present disclosure may be implemented using computer-readable media (e.g., the memory 520 or data storage 530 of FIG. 5) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A system comprising:
   a plurality of network devices configured to facilitate communication within a network domain;
   a centralized control device configured to communicate with the plurality of network devices over a control plane, the centralized control device further configured to perform operations comprising:
receive a request to modify one or more policies regarding traffic within the network domain;
in response to receiving the request, capture a snapshot of the network domain before modification of the one or more policies;
in response to receiving the request, generate a prediction of the network domain after modification of the one or more policies;
compare the snapshot of the network domain to the prediction of the network domain;
based on the comparison of the snapshot and the prediction, provide a predicted impact on the network domain; and
based on the predicted impact being above a threshold, provide an indication that the predicted impact is above the threshold.

2. The system of claim 1, wherein the operations further comprise, based on the predicted impact being below the threshold, implement the modification on the network domain.

3. The system of claim 1, wherein the operations further comprise determine a status of a user submitting the request to modify the one or more policies, and wherein the threshold is based on the status of the user.

4. The system of claim 3, wherein the status includes a title of the user or a duration of time the user has worked for an enterprise.

5. The system of claim 1, wherein the comparison of the snapshot and the prediction includes comparing one or more variables, the variables including one or more of a number of routes in the network domain, a number of port ranges used by one or more of the plurality of network devices in the network domain, a number of links of the plurality of network devices, a number of tunnels through the network domain, a structure of the routes through the network domain, a number of network devices affected by the modification, a number of the plurality of network devices reachable from outside of the network domain, one or more applications affected by the modification, a number of autonomous systems affected by the modification.

6. The system of claim 1, wherein the operations further comprise implement the modification on a sandbox machine within a simulation of the network domain but outside of the actual network domain.

7. The system of claim 1, wherein the comparison includes use of an absolute value of change of a variable between the snapshot and the prediction such that additions to or reductions of the variable are counted equally towards the predicted impact.

8. The system of claim 1, wherein the comparison includes use of a weighting factor such that modification to a first of the plurality of network devices affects the predicted impact more than modification to a second of the plurality of network devices.

9. The system of claim 1, wherein the operations further comprise based on the predicted impact being above the threshold, provide the indicated modification to a user for review of the modification.

10. A method comprising:
receiving at a centralized control device a request to modify one or more policies regarding traffic within a network domain;
in response to receiving the request, capturing a snapshot of the network domain before modification of the one or more policies;
in response to receiving the request, generating a prediction of the network domain after modification of the one or more policies;
comparing the snapshot of the network domain to the prediction of the network domain;
based on the comparison of the snapshot and the prediction, providing a predicted impact on the network domain; and
based on the predicted impact being above a threshold, providing an indication that the predicted impact is above the threshold.

11. The method of claim 10, further comprising, based on the predicted impact being below the threshold, implementing the modification on the network domain.

12. The method of claim 10, further comprising determining a status of a user submitting the request to modify the one or more policies, and wherein the threshold is based on the status of the user.

13. The method of claim 12, wherein the status includes a title of the user or a duration of time the user has worked for an enterprise.

14. The method of claim 10, wherein comparing the snapshot and the prediction includes comparing one or more variables, the variables including one or more of a number of routes in the network domain, a number of port ranges used by one or more of the plurality of network devices in the network domain, a number of links of the plurality of network devices, a number of tunnels through the network domain, a structure of the routes through the network domain, a number of network devices affected by the modification, a number of the plurality of network devices reachable from outside of the network domain, one or more applications affected by the modification, a number of autonomous systems affected by the modification.

15. The method of claim 10, further comprising implementing the modification on a sandbox machine within a simulation of the network domain but outside of the actual network domain.

16. The method of claim 10, wherein comparing the snapshot and the prediction includes using an absolute value of change of a variable between the snapshot and the prediction such that additions to or reductions of the variable are counted equally towards the predicted impact.

17. The method of claim 10, wherein comparing the snapshot and the prediction includes using a weighting factor such that modification to a first of the plurality of network devices affects the predicted impact more than modification to a second of the plurality of network devices.

18. The method of claim 10, further comprising based on the predicted impact being above the threshold, providing the indicated modification to a user for review of the modification.

19. A method comprising:
receiving at a centralized control device a request to modify one or more policies regarding traffic within a network domain from a user;
in response to receiving the request, capturing a first snapshot of the network domain before modification of the one or more policies;
determining a status of the user;
based on the status of the user, implementing the modification of the one or more policies in the network domain;
generating a second snapshot of the network domain after implementing the modification of the one or more policies;

comparing the first snapshot to the second snapshot of the network domain;

based on the comparison of the first snapshot and the second snapshot, providing an impact on the network domain; and based on the impact being above a threshold, providing an indication that the impact is above the threshold.

20. The method of claim 19, wherein comparing the first snapshot and the second snapshot includes comparing one or more variables, the variables including one or more of a number of routes in the network domain, a number of port ranges used by one or more of the plurality of network devices in the network domain, a number of links of the plurality of network devices, a number of tunnels through the network domain, a structure of the routes through the network domain, a number of network devices affected by the modification, a number of the plurality of network devices reachable from outside of the network domain, one or more applications affected by the modification, a number of autonomous systems affected by the modification.

* * * * *